:::

US011227051B2

(12) United States Patent
Chiu

(10) Patent No.: US 11,227,051 B2
(45) Date of Patent: Jan. 18, 2022

(54) METHOD FOR DETECTING COMPUTER VIRUS, COMPUTING DEVICE, AND STORAGE MEDIUM

(71) Applicant: HON HAI PRECISION INDUSTRY CO., LTD., New Taipei (TW)

(72) Inventor: Liang-Te Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 180 days.

(21) Appl. No.: 16/668,043

(22) Filed: Oct. 30, 2019

(65) Prior Publication Data
US 2020/0334358 A1  Oct. 22, 2020

(51) Int. Cl.
*G06F 21/56* (2013.01)
*H04L 9/32* (2006.01)

(52) U.S. Cl.
CPC .......... *G06F 21/565* (2013.01); *H04L 9/3239* (2013.01); *G06F 2221/033* (2013.01)

(58) Field of Classification Search
None
See application file for complete search history.

(56) References Cited

U.S. PATENT DOCUMENTS

| 8,656,494 | B2 * | 2/2014 | Pavlyushchik | G06F 21/00 |
| | | | | 726/24 |
| 2008/0208935 | A1 | 8/2008 | Palliyil et al. | |
| 2011/0167275 | A1 * | 7/2011 | Niemela | G06F 21/565 |
| | | | | 713/188 |
| 2014/0013434 | A1 * | 1/2014 | Ranum | H04L 67/10 |
| | | | | 726/24 |
| 2016/0283920 | A1 | 9/2016 | Fisher et al. | |
| 2016/0328300 | A1 * | 11/2016 | Rahardjo | G06F 11/1469 |
| 2018/0157700 | A1 * | 6/2018 | Roberts | G06F 16/2365 |
| 2018/0302417 | A1 * | 10/2018 | Wilson | G06F 16/24 |
| 2018/0336350 | A1 * | 11/2018 | Lin | G06F 21/56 |
| 2019/0354725 | A1 * | 11/2019 | Lowagie | G06F 21/64 |
| 2020/0004855 | A1 * | 1/2020 | Chepak, Jr. | G06F 16/2458 |
| 2020/0259810 | A1 * | 8/2020 | Hill | H04L 9/0637 |

(Continued)

FOREIGN PATENT DOCUMENTS

RU 2638735 C2 * 12/2017
WO 2013189214 A1 12/2013

OTHER PUBLICATIONS

Wotring, Brian, "Host Integrity Monitoring: Best Practices for Deployment", Endpoint Protection—Symantec Enterprise, Broadcom webpage, Mar. 31, 2004, 6 pages. (Year: 2004).*

*Primary Examiner* — Michael Pyzocha
(74) *Attorney, Agent, or Firm* — ScienBiziP, P.C.

(57) ABSTRACT

A method for detecting computer virus applied in a computing device includes obtaining a list of clean files each with file storage path and calculating a hash value of the file name corresponding to each storage path. An original status list according to the hash value and the storage path is generated, and the original status list is written in to a blockchain network. After the computing device becomes connected to a network and therefore exposed to viruses a second list of the files can be obtained and hash value of the file name is compared to the hash value in the original status list. Differences in hash values are deemed the result of a virus and the user is warned. A computing device and storage medium are also disclosed.

7 Claims, 4 Drawing Sheets

(56) References Cited

U.S. PATENT DOCUMENTS

2020/0285743 A1* 9/2020 Strogov .............. G06F 16/1748
2020/0293658 A1* 9/2020 Krishna Murthy ... H04L 67/125
2020/0334204 A1* 10/2020 Irazabal ............. G06F 16/1837
2020/0334358 A1* 10/2020 Chiu .................... G06F 21/565

* cited by examiner

METHOD FOR DETECTING COMPUTER VIRUS, COMPUTING DEVICE, AND STORAGE MEDIUM

FIELD

The subject matter herein generally relates to computer viruses, and more particularly to a method for detecting computer virus, computing device and computer readable storage medium.

BACKGROUND

A computer virus endangers the security of computer devices. Detecting viruses is always important.

BRIEF DESCRIPTION OF THE DRAWINGS

Implementations of the present disclosure will now be described, by way of embodiments, with reference to the attached figures.

DETAILED DESCRIPTION

Figure 1:
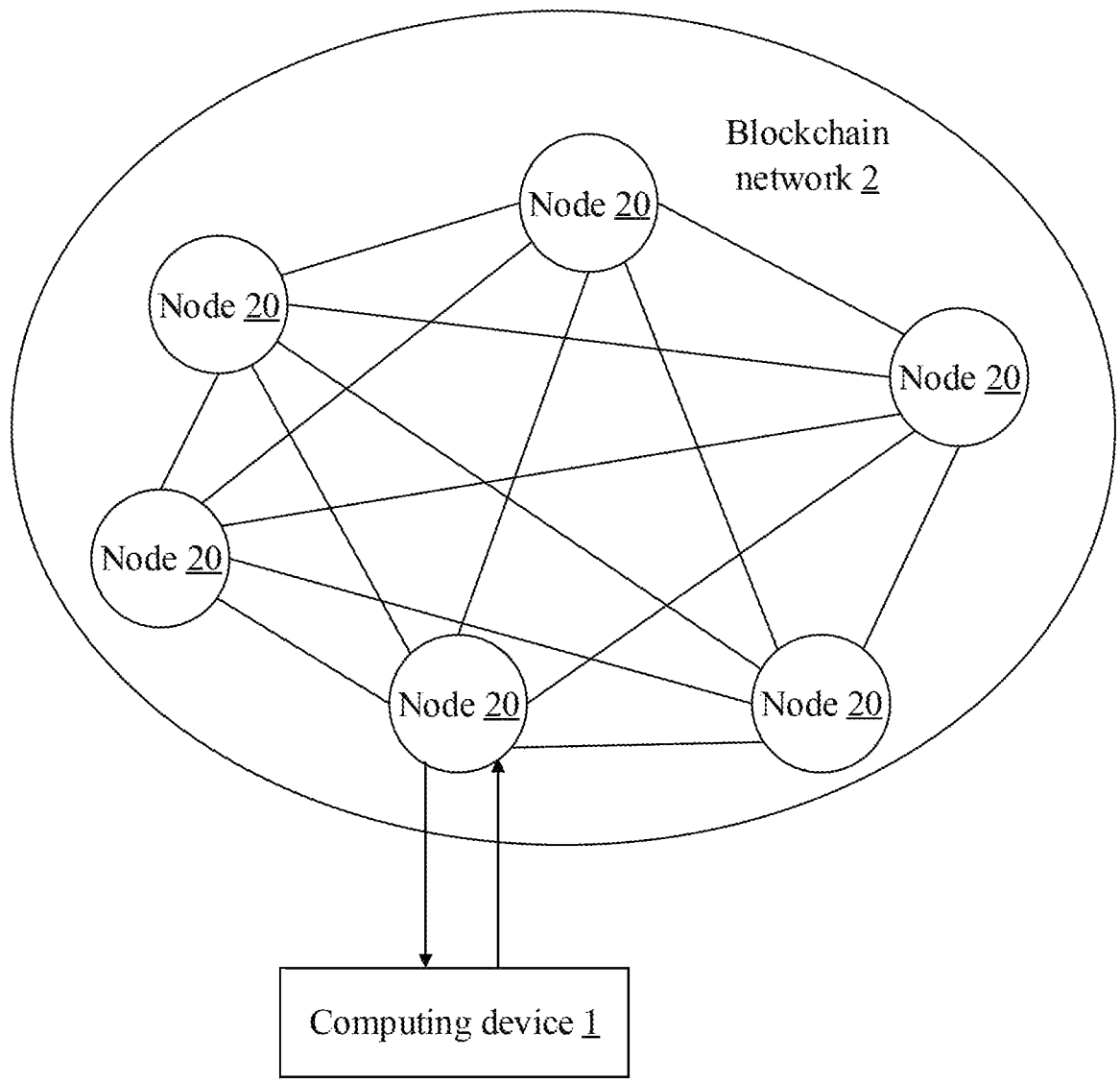
FIG. 1 is a diagram of an embodiment of a method for detecting virus in a communication system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a communication system. The communication system includes at least one computing device 1 and a blockchain network 2. The blockchain network 2 includes a number of nodes 20. The computing device 1 can establish a communication with anyone of the nodes 20 through the network to store data to the blockchain network 2 and search for data in the blockchain network 2.

The network may be a wired network or a wireless network, such as radio, WI-FI, cellular, satellite, broadcast, or the like.

The computing device 1 may be an electronic device equipped with computer virus detection software and storing a preset database storing a plurality of files. The computing device 1 may be, but is not limited to, a personal computer, a smart phone, a server, smart household appliances (such as smart TVs, smart air conditioners, smart electric fans, etc.), and computer devices in the field of intelligent environmental monitoring, intelligent agriculture, or the like.

Blockchain is a decentralized storage and computing technology. It generates persistent and unmodifiable records by superimposing encrypted blocks of data in chronological order, and stores the records in sequential nodes 20 of the blockchain network 2 to collectively maintain a reliable database.

Figure 2:
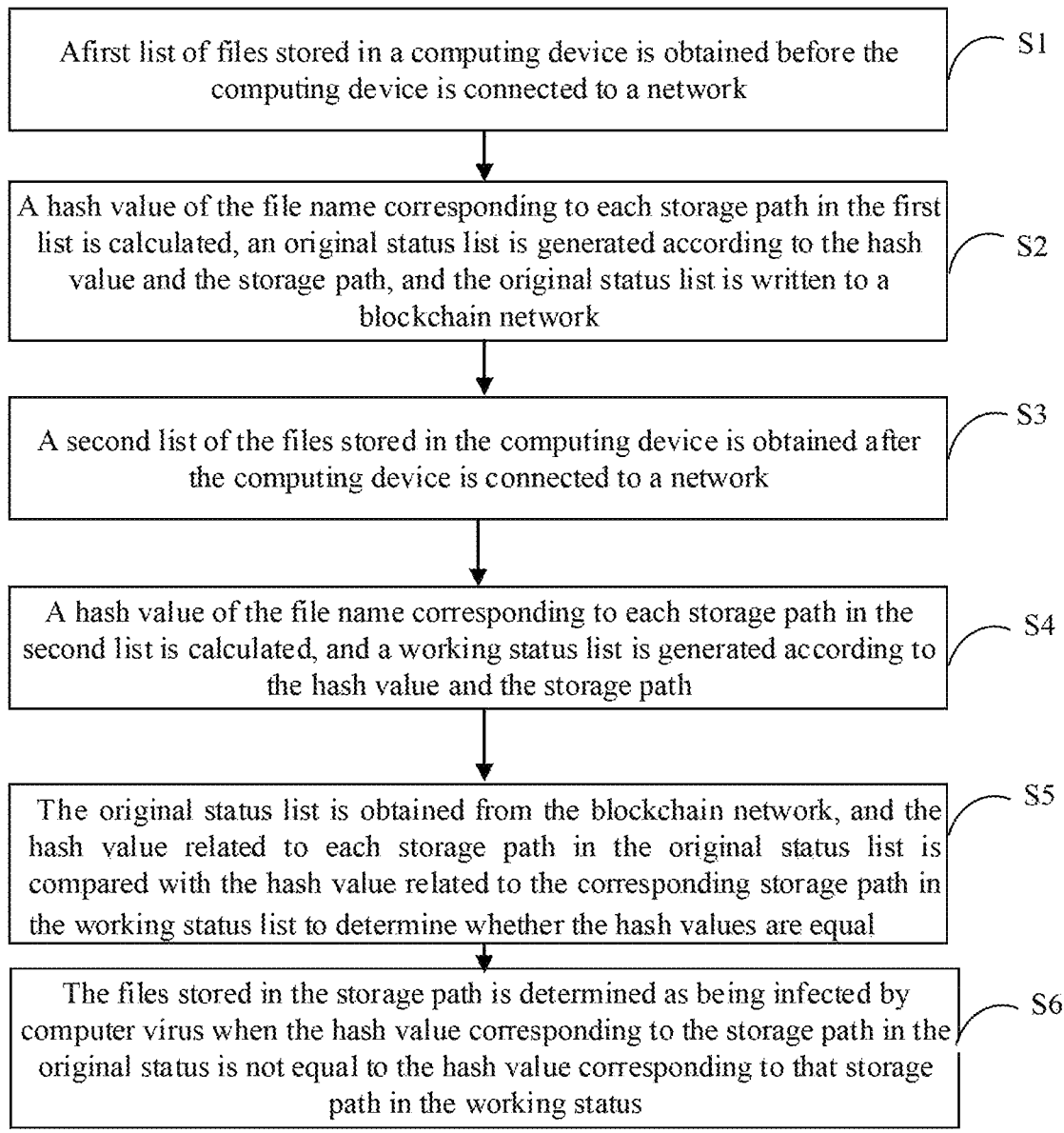
FIG. 2 is a flowchart of an embodiment of a method for detecting computer virus.

FIG. 2 shows a flowchart of a computer virus detection method. The method is provided by way of embodiment, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S1, a first list of files stored in a computing device is obtained before the computing device is connected to a network. The first list includes a number of storage paths of the files stored in the computing device and a file name of the file corresponding to each storage path.

The following table 1 is an example of the first list. In the first list, a first column records the storage paths of the files stored in the computing device, and a second column recodes the file names of the files in the storage paths.

TABLE 1

(example first list of files)

| Storage path | File name |
|---|---|
| Path 1 | file 1; file 2; file 3 |
| Path 2 | file 4; file 5 |
| Path 3 | file 6; |
| Path 4 | file 7; |

In at least one embodiment, the files in the first list can include, but are not limited to, applications installed in the computing device and system files. The first list is obtained before the computing device is connected to a network. Such network can include, but is not limited to, Ethernet or World Wide Web, and the files stored in the computing device are not infected with any computer virus. For example, the first list of files can be those of the manufacturer before the computing device is sold.

In at least one embodiment, the file names and the storage paths of the files stored in the computing device are obtained through a CMD command. The CMD command is a tool for Windows users. A resource manager reads the CMD command and outputs the file names and the storage paths.

In other embodiments, the file names and the storage paths are obtained by executing a preset script written in a programming language such as JAVA or C++.

At block S2, a hash value of the file name corresponding to each storage path in the first list is calculated, an original status list is generated according to the hash value and the storage path, and the original status list is written to a blockchain network.

The method for calculating the hash value of the file name corresponding to each storage path may include obtaining the file name and the storage path of all files in the first list and calculating the hash value of the file name corresponding to each storage path in the first list by using an algorithm. Such algorithm may include any one of SHA (Secure Hash Algorithm) 224, SHA256, SHA384, SHA512, SHA1, SHA2 or MD5 (Message Digest Algorithm 5). Then the storage paths and corresponding hash values are stored in the original status list in pairs. The following table 2 is an example of the original files (from table 1) with hash values allocated.

TABLE 2

| Storage path | Hash value |
| --- | --- |
| Path 1 | e7111158ef98771f30dad5fe36dd1d92 |
| Path 2 | efos3ng58od0ns611e2c566a645bdld3 |
| Path 3 | 162d6f607ulsih90fbd1b83ff6edl8d5n |
| Path 4 | e31ae075a1050f1dd2ba3936c2c26cc8 |

In one embodiment, a 128-bit hash value of the file name and the storage path of each file in the original status list is calculated, for example, using MD5. In other embodiments, a hash value of 160 bits is calculated using SHA1 according to the file name and the storage path of each file in the original status list.

In at least one embodiment, the original status list recording a relationship between the storage path and the hash value is transmitted to one of the nodes 20 of the blockchain network 2 for broadcast. The node 20 in the blockchain network 2 that has the right to record verifies the original status list, and writes the original status list to the blockchain by a consensus mechanism.

At block S3, a second list of the files stored in the computing device is obtained after the computing device is connected to a network. The second list includes a number of storage paths of the files stored in the computing device and a file name of the file corresponding to each storage path.

In at least one embodiment, the second list is obtained after the computing device is started and connected to the network of Ethernet or World Wide Web.

In at least one embodiment, the second list of files includes, but is not limited to, the file name and the storage path of the applications and/or system files stored in the computing device.

In at least one embodiment, the file name and the storage path of the applications and/or system files stored in the computing device are obtained through a CMD command. In other embodiments, the file name and the storage path of the applications and/or system files stored in the computing device are obtained by executing a preset script written in a programming language such as JAVA or C++.

At block S4, a hash value of the file name corresponding to each storage path in the second list is calculated, and a working status list is generated according to the hash value and the storage path.

The method for calculating the hash value of the file name corresponding to each storage path in the second list may include obtaining the file name and the storage path of all files in the second list and calculating the hash value of the file name of each storage path in the second list by using an algorithm. Such algorithm may be the same as that used for calculating the hash value of the file name in the first list. The algorithm includes any one of SHA 224, SHA256, SHA384, SHA512, SHA1, SHA2 or MD5.

At block S5, the original status list is obtained from the blockchain network, and the hash value related to each storage path in the original status list is compared with the hash value related to the corresponding storage path in the working status list. This determines whether the hash values are equal.

For example, the hash value corresponding to storage path A in the original status list is compared with the hash value corresponding to storage path A in the working status list.

In at least one embodiment, the original status list is obtained from the blockchain network 2 by running a preset existing scanning program.

In at least one embodiment, a method for comparing the hash value of the original status list with the hash value of the working status list can include obtaining a storage path and the hash value corresponding to the storage path in the original status list and searching in the working status list to find a storage path the same as the storage path in the original status list. The hash values in the original status list and the working status list corresponding the same storage path are compared.

At block S6, the files stored in the storage path will be determined as infected by computer virus when the hash value corresponding to the storage path in the original status is not equal to the hash value corresponding to that storage path in the working status list.

In a same storage path, if the hash value of the file name in the original status list is different form the hash value of the file name in the working status list, the computing device determines that the files in the storage path may be infected and thus changed by computer virus.

In at least one embodiment, the method further includes generating a prompt message indicating the storage path which is determined as being infected by computer virus.

In at least one embodiment, if the computer virus causes the computing device to fail to boot, the storage device can be connected to another computing device which is not infected by the computer virus. The other computing device obtains the second list and generates the working status list, the other computing device is connected to the blockchain network 2 to search for the original status list, and the hash value related to each storage path in the original status list is compared with the hash value related to the corresponding storage path in the working status list to determine whether the hash values are equal. If the corresponding hash values are equal to each other, the computing device is deemed not infected by the computing virus. If the corresponding hash values are not equal to each other, the files stored in the storage path is deemed infected by computer virus.

Figure 3:
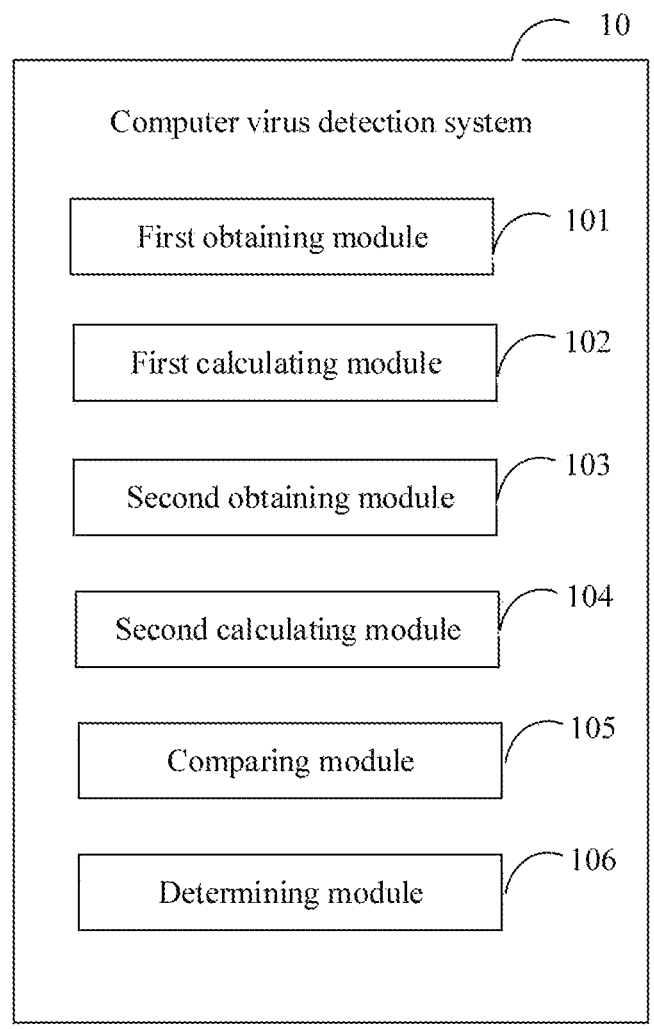
FIG. 3 is a block diagram of an embodiment of a system for virus detection.

FIG. 3 shows a block diagram of an embodiment of a virus detection system 10. The virus detection system 10 may operate in a computing device, such as the computing device 1. The virus detection system 10 may include a plurality of functional modules according to functions performed by the virus detection system 10. The functional modules may include a first obtaining module 101, a first calculating module 102, a second obtaining module 103, a second calculating module 104, a comparing module 105, and a determining module 106.

The first obtaining module 101 obtains a first list of files stored in the computing device before the computing device is connected to a network. The first list includes a number of storage paths of the files stored in the computing device and a file name of the file corresponding to each storage path.

In at least one embodiment, the files in the first list can include, but are not limited to, applications installed in the computing device and system files. The first list is obtained before the computing device is connected to a network, such network including, but is not limited to, Ethernet or World Wide Web. The files stored in the computing device are not infected with computer virus, being for example the files installed by the manufacturer.

In at least one embodiment, the file names and the storage paths of the files stored in the computing device are obtained through a CMD command. A resource manager reads the CMD command and outputs the file names and the storage paths.

In other embodiments, the file names and the storage paths are obtained by executing a preset script written in a programming language such as JAVA or C++.

The first calculating module 102 calculates a hash value of the file name corresponding to each storage path in the first list, and generates an original status list according to the hash value and the storage path. The original status list is written to the blockchain network 2.

The method for calculating the hash value of the file name corresponding to each storage path may include obtaining the file name and the storage path of all files in the first list and calculating the hash value of the file name corresponding to each storage path in the first list by using an algorithm. The algorithm may include any one of SHA (Secure Hash Algorithm) 224, SHA256, SHA384, SHA512, SHA1, SHA2 or MD5 (Message Digest Algorithm 5). The storage paths and corresponding hash values are stored in pairs in the original status list.

In at least one embodiment, the original status list recording a relationship between the storage path and the hash value is transmitted to one of the nodes 20 of the blockchain network 2 for broadcast. The node 20 in the blockchain network 2 that has the right to record verifies the original status list, and writes the original status list to the blockchain by a consensus mechanism.

The second obtaining module 103 obtains a second list of the files stored in the computing device after the computing device is connected to a network. The second list includes a number of storage paths of the files stored in the computing device and a file name of the file corresponding to each storage path.

In at least one embodiment, the second list is obtained after the computing device is started and connected to the network of Ethernet or World Wide Web.

In at least one embodiment, the second list of files includes, but is not limited to, the file name and the storage path of the applications and/or system files stored in the computing device.

In at least one embodiment, the file name and the storage path of the applications and/or system files stored in the computing device are obtained through a CMD command. In other embodiments, the file name and the storage path of the applications and/or system files stored in the computing device are obtained by executing a preset script written in a programming language such as JAVA or C++.

The second calculating module 104 calculates a hash value of the file name corresponding to each storage path in the second list, and generates a working status list according to the hash value and the storage path.

The method for calculating the hash value of the file name corresponding to each storage path in the second list may include obtaining the file name and the storage path of all files in the second list and calculating the hash value of the file name of each storage path in the second list by using an algorithm. The algorithm may be the same as that for calculating the hash value of the file name in the first list. The possible algorithms include any one of SHA 224, SHA256, SHA384, SHA512, SHA1, SHA2, or MD5.

The comparing module 105 obtains the original status list from the blockchain network, and the hash value related to each storage path in the original status list is compared with the hash value related to the corresponding storage path in the working status list to determine whether the hash values are equal.

For example, the hash value corresponding to storage path A in the original status list is compared with the hash value corresponding to storage path A in the working status list.

In at least one embodiment, the original status list is obtained from the blockchain network 2 by running a preset existing scanning application.

In at least one embodiment, a method for comparing the hash value of the original status list with the hash value of the working status list can include obtaining a storage path and the hash value corresponding to the storage path in the original status list and searching in the working status list to find a storage path which is the same as the storage path in the original status list. A comparison is made between the hash values in the original status list and the working status list corresponding the same storage path.

The determining module 106 determines that the files stored in the storage path are infected by computer virus when the hash value corresponding to the storage path in the original status is different from the hash value corresponding to that storage path in the working status list.

In a same storage path, if the hash value of the file name in the original status list is different from the hash value of the file name in the working status list, the computing device determines that the files in the storage path may be changed by computer virus.

In at least one embodiment, the determining module 106 further generates a prompt message indicating the storage path which is determined as being infected by computer virus, to warn the user.

Figure 4:
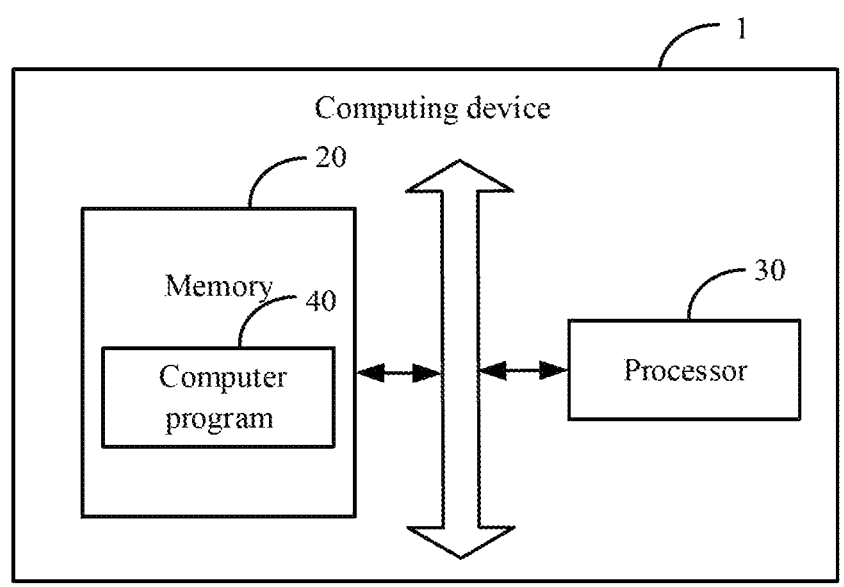
FIG. 4 is a block diagram of an embodiment of a computing device.

FIG. 4 shows a block diagram of the computing device 1. The computing device 1 includes a memory 20 and a processor 30. The memory 20 stores a computer program 40, such as a computer virus detection program, which is executed by the processor 30. When the processor 30 executes the computer program 40, the blocks in the computer virus detection method may be implemented, such as the blocks S1-S6 shown in FIG. 2. Alternatively, when the processor 30 executes the computer program 40, the functions of the functional modules in the virus detection system 10 shown in FIG. 3 may be implemented.

The computer program 40 can be partitioned into one or more modules/units that are stored in the memory 20 and executed by the processor 30. The one or more modules/units may be a series of computer program instructions capable of performing particular functions of the computer program 40. For example, the computer program 40 can be segmented into the first obtaining module 101, the first calculating module 102, the second obtaining module 103, the second calculating module 104, the comparing module 105, and the determining module 106.

The computing device 1 may be a desktop computer, a notebook computer, a cloud server, or the like. Another computing device 1 may include more or less components than those illustrated, and some components may be combined. The computing device 1 may also include input and output devices, network access devices, buses, and the like.

The processor 30 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 30 may be a microprocessor or other processor known in the art.

The memory 20 can be used to store the computer program 40 and/or modules/units by running or executing computer programs and/or modules/units stored in the memory 20. The memory 20 may include a storage program area and a storage data area. In addition, the memory 20 may include a random access memory, a non-volatile memory such as a hard disk, a plug-in hard disk, a smart memory card (SMC), and a secure digital (SD) card, flash card, at least one disk storage device, flash device, or other volatile solid state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A method for detecting computer virus comprising:
   obtaining a first list of files stored in a computing device before the computing device being connected to a network, wherein the first list comprises a number of storage paths of the files stored in the computing device and a file name of each file corresponding to each storage path;
   calculating a hash value of the file name corresponding to each storage path in the first list, generating an original status list according to the hash value and the storage path, and writing the original status list to a blockchain network;
   obtaining a second list of the files stored in the computing device after the computing device is connected to a network, wherein the second list comprises a number of storage paths of the files stored in the computing device and a file name of the file corresponding to each storage path;
   calculating a hash value of the file name corresponding to each storage path in the second list, and generating a working status list according to the hash value and the storage path;
   obtaining the original status list from the blockchain network, and comparing the hash value related to each storage path in the original status list with the hash value related to the corresponding storage path in the working status list to determine whether the hash values are equal; and
   determining that the files stored in the storage path being infected by computer virus when the hash value corresponding to the storage path in the original status is not equal to the hash value corresponding to that storage path in the working status;
   wherein the method further comprises:
   connecting a storage device of the computing device to another computing device which is not infected by computer virus when the computing device fails to boot;
   obtaining the second list and generating the working status list using the other computing device;
   connecting the other computing device to the blockchain network and searching for the original status list from the blockchain network using the other computing device;
   determining, by the other computing device, whether the files stored in the storage path being infected by the computing virus by comparing the hash value related to each storage path in the original status list with the hash value related to the corresponding storage path in the working status list.

2. The method of claim 1, wherein the files in the first list comprises applications installed in the computing device and system files.

3. The method of claim 2, wherein the file names and the storage paths of the files stored in the computing device are obtained through a CMD command or by executing a preset script written in a programming language.

4. The method of claim 1, wherein a method for calculating the hash value of the file name corresponding to each storage path comprises:
   obtaining the file name and the storage path of all files in the first list; and
   calculating the hash value of the file name corresponding to each storage path in the first list by using an algorithm.

5. The method of claim 4, wherein the algorithm is selected from a group consisting of: SHA224, SHA256, SHA384, SHA512, SHA1, SHA2 or MD5.

6. The method of claim 1, wherein a method for comparing the hash value of the original status list with the hash value of the working status list comprises:
   obtaining a storage path and the hash value corresponding to the storage path in the original status list;
   searching in the working status list to find a storage path the same as the storage path in the original status list; and
   comparing the hash values in the original status list and the working status list corresponding the same storage path.

7. The method of claim 1, further comprising:
   generating a prompt message according to the storage path which is determined as being infected by computer virus, to prompt the user to remove the computer virus in the storage path.

* * * * *

UNITED STATES PATENT AND TRADEMARK OFFICE
CERTIFICATE OF CORRECTION

PATENT NO. : 11,227,051 B2
APPLICATION NO. : 16/668043
DATED : January 18, 2022
INVENTOR(S) : Liang-Te Chiu It is certified that error appears in the above-identified patent and that said Letters Patent is hereby corrected as shown below:

On the Title Page

Column 1, please add Item (30) regarding "Foreign Application Priority Data":
(30) Foreign Application Priority Data
Apr. 19, 2019(CN)..............201910321502.7

Signed and Sealed this
Twentieth Day of September, 2022

Katherine Kelly Vidal
*Director of the United States Patent and Trademark Office*